United States Patent [19]

Tucker

[11] Patent Number: 4,821,681
[45] Date of Patent: Apr. 18, 1989

[54] SQUIRREL-PROOF BIRDFEEDER

[75] Inventor: James E. Tucker, Batavia, Ill.

[73] Assignee: Weber-Stephen Products Co., Palatine, Ill.

[21] Appl. No.: 72,873

[22] Filed: Jul. 14, 1987

[51] Int. Cl.⁴ .............................................. A01K 39/01
[52] U.S. Cl. ................................................... 119/51 R
[58] Field of Search ..................... 119/51 R, 52 R, 63; D30/124, 125, 126, 127, 128

[56] References Cited

U.S. PATENT DOCUMENTS

| | | | |
|---|---|---|---|
| D. 231,368 | 4/1974 | Motter III | D30/126 |
| D. 241,149 | 8/1976 | Miller et al. | D30/128 |
| 2,866,435 | 12/1958 | Blazier | 119/53 |
| 2,891,508 | 6/1959 | Bower | 119/51 R |
| 3,117,554 | 1/1964 | Taylor | 119/51 R X |
| 3,182,635 | 5/1965 | Waite | 119/51 R |
| 3,788,279 | 1/1974 | Boehland, Jr. | 119/52 R |
| 3,948,220 | 4/1976 | Fiedler | 119/51 R |
| 4,030,451 | 6/1977 | Miller | 119/51 R |
| 4,102,308 | 7/1978 | Kilham | 119/52 R |
| 4,207,839 | 6/1980 | Barry | 119/51 R |

*Primary Examiner*—Robert P. Swiatek
*Attorney, Agent, or Firm*—Wallenstein Wagner Hattis & Strampel Ltd.

[57] ABSTRACT

A birdfeeder includes a upwardly-opening tray (12) that has an center post or rod (14) affixed thereto and a cover or hood (16) supported on the post and biased by biasing member (32) towards an upward collar (20) with the biasing member accommodating tilting of the cover upon the application of an external force to eject the species that produces the external force.

5 Claims, 2 Drawing Sheets

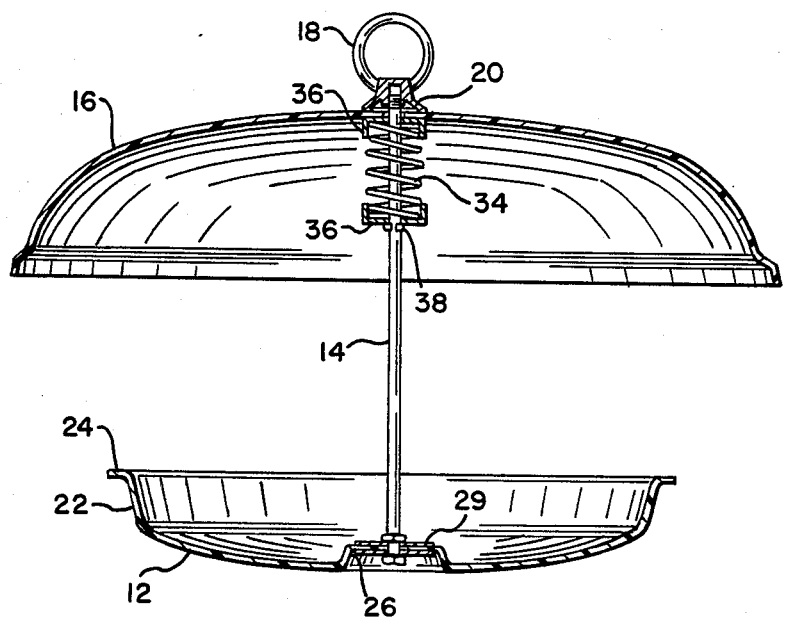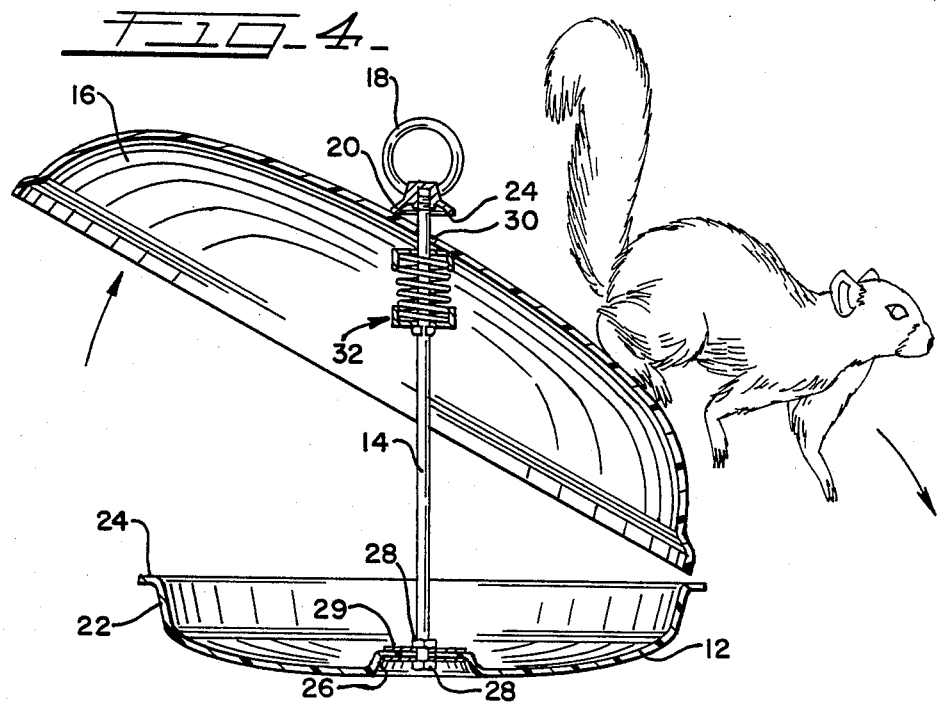

SQUIRREL-PROOF BIRDFEEDER

DESCRIPTION

1. Technical Field

The present invention relates generally to birdfeeders and, more particularly, to hanging tray-type birdfeeders having a pivotable cover.

2. Background Prior Art

Generally, birdfeeders of known construction either are of the tray-type wherein all of the birds gain access to a central feed source or of the perch type with independent openings adjacent each perch for the birds to gain access to the seeds.

As is known, birds exhibit a variety of feeding behavior patterns and may be classified by such habits, i.e., as perch- or clinging-type feeders. One type of perch feeder that has been successfully marketed by the Assignee of the present invention is disclosed in U.S. Pat. No. 4,632,061. Another type of feeder that has been marketed by the Assignee of the present invention is the hopper-type, such as disclosed in U.S. Pat. No. Des. 289,210.

Also representative of prior art feeders are constructions wherein a hood is disposed generally vertically above a feed tray so as to protect the seeds from the elements, such as rain and snow, and also to form a shield so that squirrels and other related pests are prevented or deterred from gaining access to the feed contained therein. Such hoods or covers normally take the form of a disc- or dome-shaped construction, and examples are shown in U S. Pat. Nos. 4,102,308 and 4,207,839. In order to insure that squirrels or other animals cannot gain access to the bird seed, U.S. Pat. No. 4,207,839 discloses a generally hemispherical container or tray and a much larger hemispherical cover or hood with pivotal interconnections so that an external force on the top of the hood will tilt the hood and produce an overlap with the container to prevent the squirrel from gaining access to the food. While such arrangement is acceptable for preventing squirrels from gaining access to the bird seed, the construction is rather complicated, requiring a large amount of material for the construction of the hood and also requires a number of pieces for producing the double-pivotal connection for the tilting action.

Accordingly, it would be desirable to reduce or prevent access by animals, such as squirrels, without the need for expanding the hood dimensions to an undesirable large dimension in relation to the feed assembly.

SUMMARY OF THE INVENTION

The present invention accomplishes the above-indicated aims by the provision of a birdfeeder construction that includes a lower feed tray and an upper support cover or hood that will automatically tilt upon the application of an external force to the periphery of the hood to eject any animal that may land on the hood. The novel birdfeeder construction of the present invention includes readily-available components that can be produced at a minimum cost and can easily be assembled by a novice. Furthermore, the construction is such that the unit can easily be shipped in a small package, thereby minimizing the packaging and the shipping charges.

More specifically, according to the present invention, the novel birdfeeder includes a lower feed tray that has a center support post extending upwardly therefrom and having a hook at its upper end. The hook is preferably threaded onto the upper end of the post and has a lower exposed enlarged collar defining an abutment surface around the post. The cover or hood has an enlarged opening for receiving the post and biasing means or a compression member is interposed between the post and the lower surface of the cover so that the cover is normally biased into engagement with the abutment surface so that the cover extends substantially parallel to the tray and is larger in diameter to overlap the periphery of the tray.

The compression member is designed to accommodate tilting of the cover or hood upon the application of a downward force on the cover remote from the post to eject unwanted species from the cover and prevent them from gaining access to the bird seed.

In the specific embodiment illustrated, the compression member is in the form of a coil spring and the post has a projection spaced from the cover with a first cup telescoped onto the post and engaging the projection with a second cup interposed between the coil spring and the cover so that the coil spring normally biases the cover into the upright position into engagement with the upper collar.

BRIEF DESCRIPTION OF DRAWINGS

FIG. 3 is a cross-sectional view through the center of the feeder; and,

FIG. 4 is a view similar to FIG. 3 showing the tilting of the cover upon the application of an external force to eject an animal, such as a squirrel.

DETAILED DESCRIPTION

Figure 1:
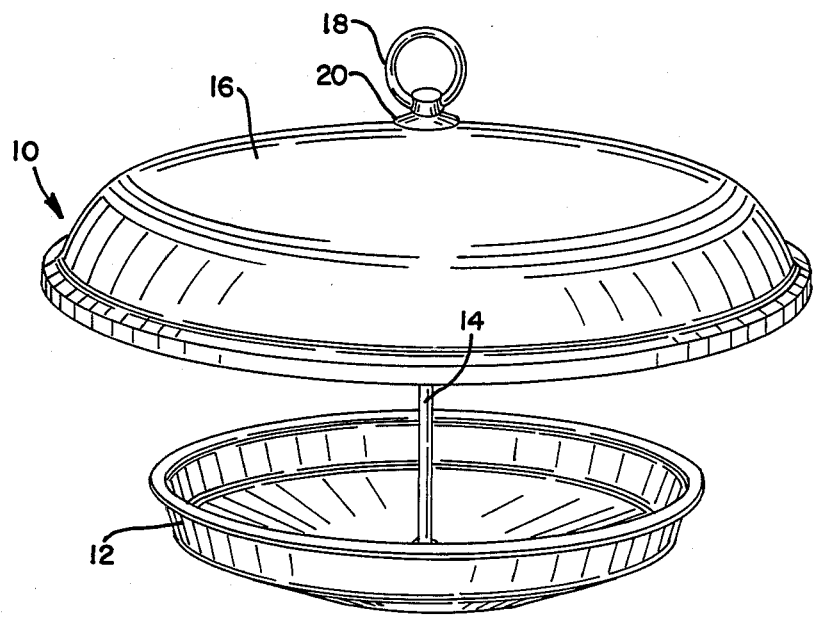
FIG. 1 is a perspective view of the birdfeeder constructed in accordance with the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

FIG. 1 of the drawings shows a birdfeeder, generally designated by reference numeral 10, that consists of a lower feed tray 12, that has a center post 14 extending upwardly therefrom and a cover or hood 16 at the upper end of the post which is releasably-retained by a support hook 18 which preferably has an enlarged collar 20 at the lower end thereof and is threaded onto the upper end of the rod or post 14, as shown in FIG. 4.

With the configuration of the tray illustrated in FIGS. 3 and 4, it is formed as a substantially flat dish or pan that has a generally vertical peripheral wall 22 and an outwardly-directed flange 24 on the upper end thereof. A center raised collar portion 26 has a central opening for receiving the lower end of the post 14, which is threaded to receive lock nuts 28 to securely affix the post to the tray. If desired, suitable enlarged washers 29 may be interposed between opposite surfaces of the tray and the lock nuts 28.

Figure 2:
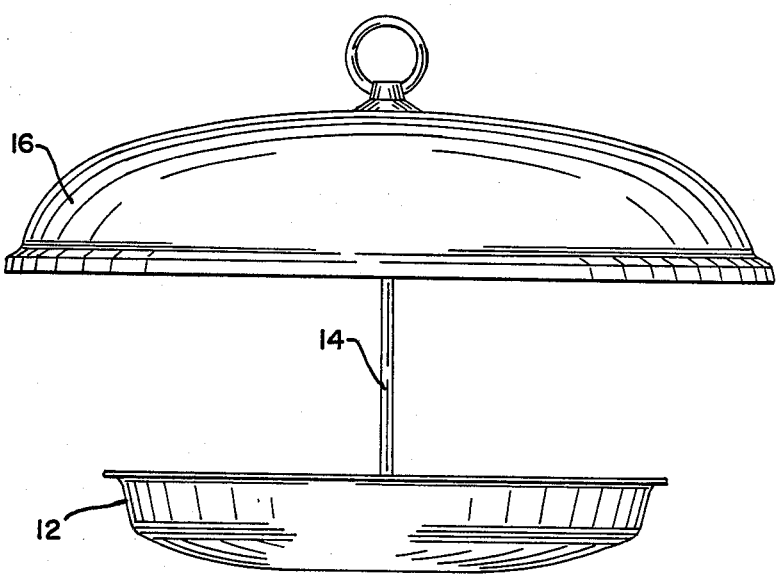
FIG. 2 is a side elevational view thereof.

According to the primary aspect of the invention, the cover or hood 16 is supported on the post 14 in such a fashion that it will automatically tilt from the generally upright position (FIGS. 1, 2 and 3) to the tilted position (FIG. 4) upon the application of an external force to the periphery of the hood.

For this purpose, the cover 16 has an enlarged opening 30 which receives the center post and a biasing means or a compressible member 32 is interposed between the post and the cover to bias the cover to the position shown in FIG. 3. In the specific embodiment illustrated, the biasing means 32 is in the form of a coil spring 34 that has one end received into a cup-shaped member 36 that is supported on an abutment defined by projections 38 on the post 14. The opposite end of the coil spring 34 is received into an identical collar or cup 36, which is interposed between the lower surface of the cover 16 and the upper end of the spring 34.

Thus, with the construction illustrated and described, the coil spring or compression member 34 normally biases the cover to the position shown in FIG. 3 wherein the upper outer surface of the cover is in extended engagement with the abutment surface 21 of the collar 20.

Thus, since the cover has a larger diameter than the tray, the cover will protect the tray from rain, snow and unwanted species, such as squirrels. For example, if a squirrel were to land on the cover at any point away from the center post, the external force applied by the squirrel would compress the coil spring 34 and allow the cover to tilt to the position illustrated in FIG. 4, wherein the squirrel would be ejected because it would not have any gripping force on the smooth surfaced cover. When the external force is removed, the cover will automatically return to its upright position, shown in FIG. 3.

It should be noted that while the cover has been shown as arcuate or generally dome shaped with an outer peripheral edge, the cover could take any other configuration so long as it is larger in size than the corresponding lower tray.

Of course, numerous modifications come to mind without departing from the spirit of the invention. For example, the biasing means 32 could be in the form of a compressible rubber member that returns to its original shape upon removal of any external forces thereon. Under such circumstances, the upper cup or collar 36 could be eliminated.

While the specific embodiments have been illustrated and described, numerous modifications come to mind without significantly departing from the spirit of the invention and the scope of protection is only limited by the scope of the accompanying claims.

I claim:

1. A hanging birdfeeder comprising a lower feed tray having a center support post affixed thereto and extending upwardly with means at an upper end of said post for suspending said tray and a cover supported on said post and spaced above said tray and being larger than said tray for diverting rain and unwanted species from access to said tray, and biasing means between said cover and post normally maintaining said cover in parallel upright relation to said tray, said biasing means including a coil spring below said cover with said post having a projection spaced from said cover and a circular cup engaging said projection and receiving said coil springs, said biasing means facilitating tilting pivotal movement of said cover on said post upon the application of a downward force to said cover remote from said post to eject unwanted species, such as squirrels, from said cover.

2. A birdfeeder as defined in claim 1, in which said cover has an enlarged opening receiving said post, and further including a second cup between said coil spring and said cover and an enlarged second abutment fixed to said post above said cover.

3. A birdfeeder as defined in claim 1, in which said tray and cover are circular and disposed symmetrically around said post.

4. A birdfeeder comprising a center post having a feed tray secured to a lower end thereof and a support member threaded on an upper end thereof with said support member defining an abutment surface surrounding said post, an arcuate cover having an enlarged opening receiving said post so that an upper surface extends toward said abutment surface and compressible means between said post and a lower surface of said cover for forcing said upper surface into extended engagement with said abutment surface so that said cover protects said tray from rain and other undesirable elements, said compressible means accommodating tilting of said cover on said post upon the application of an external force to a peripheral portion of said upper surface, said compressible means including a coil spring with a first cup on said post engaging one end of said spring and a second cup interposed between an opposite end of said coil spring and said lower surface of said cover.

5. A birdfeeder as defined in claim 4, in which said tray and said cover are circular and said cover is larger than said tray.

* * * * *